July 31, 1928.  1,679,076
E. K. DEGENER
UNIVERSAL JOINT
Filed May 15, 1926
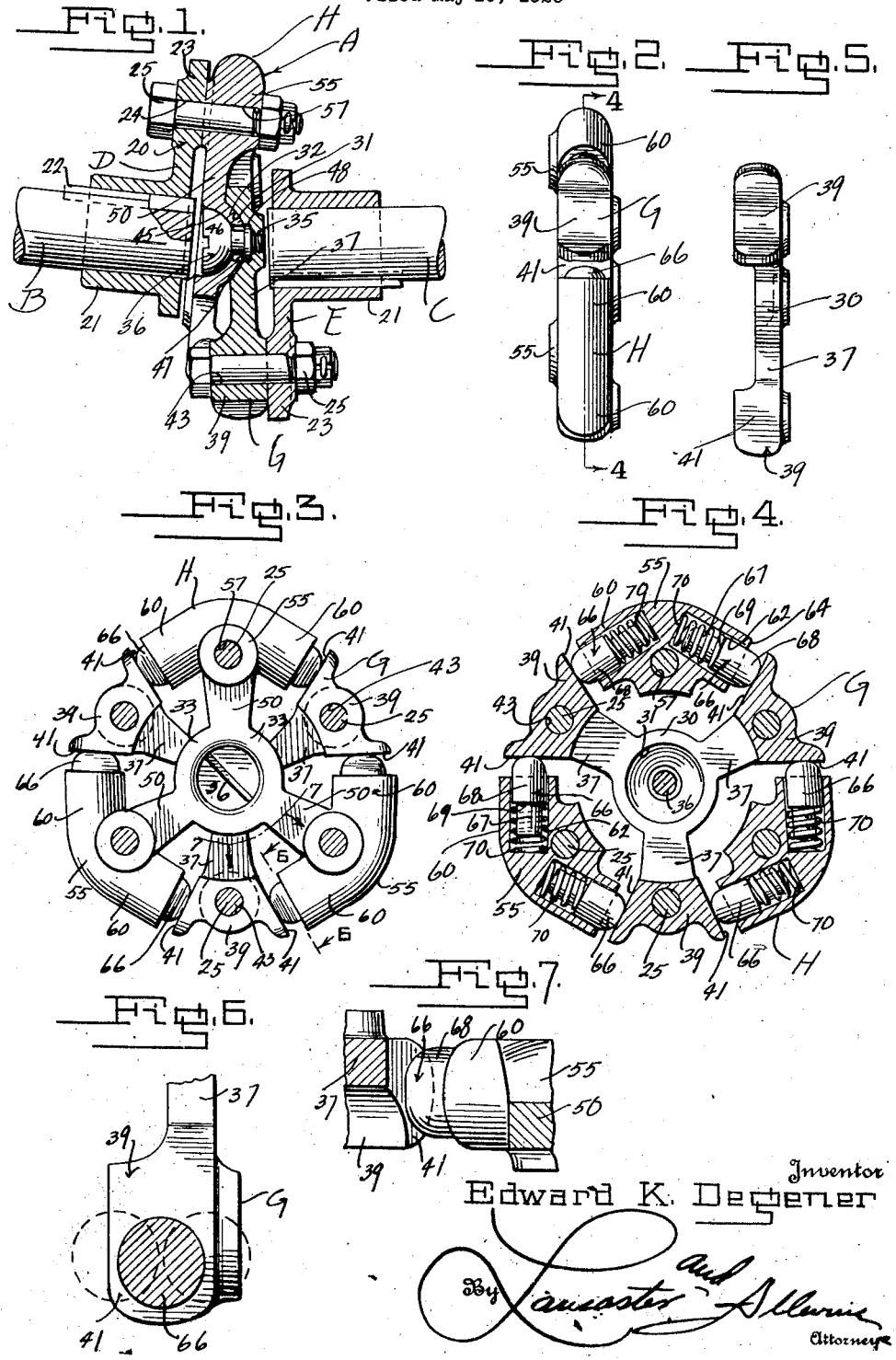
Inventor
Edward K. Degener Patented July 31, 1928.

1,679,076

UNITED STATES PATENT OFFICE.

EDWARD K. DEGENER, OF HUNTINGTON PARK, CALIFORNIA, ASSIGNOR TO DEGENER CUSHION UNIVERSAL CORPORATION, OF LOS ANGELES, CALIFORNIA, A CORPORATION OF CALIFORNIA.

UNIVERSAL JOINT.

Application filed May 15, 1926. Serial No. 109,437.

This invention relates to improvements in universal joints.

The primary object of this invention is the provision of a relatively economical and efficient type of universal joint construction, which is very compact, and which may connect a pair of shaft sections so that they may be disposed at less than 180° for drive of one shaft by the other.

A further object of this invention is the provision of an improved universal joint construction including a pair of members having arms in alternate relation, the arms on one of the members having a novel means supported thereby for slidably abutting the arms of the other member, to permit angular movement of the members during rotation, without any positive connection of the arms of said members.

A further object of this invention is the provision of improved joint including a pair or relatively movable members having novel resilient means included in the same to serve as a buffing feature therefor to relieve shock upon a driven shaft.

A further object of this invention is the provision of an improved universal joint construction, embodying a pair of rigid metallic members, connected in a flat compact relation, similar to the conventional fiber universal joint, but embodying more durable features than the conventional fiber joint; the improved joint including a resilient or buffing feature.

Other objects and advantages of this invention will be apparent during the course of the following detailed description.

In the accompanying drawing, forming a part of this specification, and wherein similar reference characters designate corresponding parts throughout the several views, Figure 1 is a sectional view taken longitudinally of a pair of shaft sections, thru the improved universal joint, showing the manner in which the same connects the shaft sections.

Figure 2 is an edge elevation of the improved universal joint, showing the shafts disconnected therefrom.

Figure 3 is a view looking from one end of the universal joint, showing the related details thereof.

Figure 4 is a transverse sectional view taken through the improved universal joint, showing the structural features thereof, this view preferably being taken on the line 4—4 of Figure 2.

Figure 5 is an edge elevation of one of the members of the universal joint, showing the compact detailed construction thereof.

Figure 6 is an enlarged sectional view taken substantially on the line 6—6 of Figure 3.

Figure 7 is an enlarged sectional view taken substantially on the line 7—7 of Figure 3.

In the drawing, wherein for the purpose of illustration is shown only a preferred embodiment of this invention, the letter A may generally designate the improved universal joint, which is adapted to connect shaft sections B and C, by means D and E respectively.

The shaft sections B and C are of course of the conventional type, and the means D and E each includes a spider member 20, of the type described in detail in my United States application, Serial No. 751,611, filed November 22, 1924; each of these members including a sleeve 21 which is keyed at 22 to the respective shafts; the member 21 including radially extending arms 23, preferably three in number, having transverse openings 24 therethrough at the free ends thereof for receiving bolts 25 for connection of the different parts of the universal joint A.

The principal construction of the universal joint A comprises centrally connected members G and H, which are respectively rigidly connected to the shaft sections B and C.

Referring to the member G, the same includes a hub portion 30, which is relatively shallow in thickness, on the inside face thereof the same having the socket or cavity 31 for receiving a ball portion 32 of the hub 33 of the other section H which will be subsequently described, in order to pivotally connect the sections. At the center of the hub 30 the same is provided with a screw threaded passageway 35 therethrough for detachably receiving a connecting bolt 36 which will be subsequently described.

Integral with the hub 30 are three radially extending arms 37, which are preferably of the same thickness as the adjacent hub portion 30, and which at the outer ends thereof each supports a head 39 which is relatively thicker than the arm portion 37. These heads 39 are of novel formation, and the increase in thickness of the head over the arm portion 37, as is illustrated in Figure 6 of the drawings, is accomplished by increasing the portion of the stock at the inner side of the arm 37, so that each of the heads 39 includes an inwardly projecting portion at the inner side of the arm 37. These heads 37 are of tapering increasing width from the arm 37 outwardly, and provide the flat or plane radial side surfaces 41, which diverge from the arm 37 outwardly, and which are free of projections and indentations, and upon which certain means of the member H has a free sliding movement, in order to accomplish the universal connection of the members G and H in a manner which will be subsequently described. Each of the heads 39 is provided with a transverse opening 43 therethrough, through which the shank of the bolt means 25 above mentioned may extend, for rigidly connecting the spider means E thereto, in order to rigidly connect the member G to one of the shafts. At its outer surface the head 39 may be suitably recessed or grooved to lessen the material thereof and decrease the weight of the universal joint as much as practical.

Referring to the member H, the same includes the hub portion 33 above mentioned, which at one side thereof is provided with the hollow ball-shaped projection 32 adapted to ride in the socket 31 of the member G. This ball shaped projecting portion 32, at the opposite side of the hub, is provided with a concavity or recess 45, adapted to receive the half-cylindrical shaped head 46 of the bolt 36. Centrally through the projection 32 a passageway 47 is provided, through which the shank of the bolt 36 extends, so that the screw threaded end thereof may detachably engage in the screw threaded opening 35 of the member G. It is to be noted that upon the shank of the bolt 36 an annular collar 48 is provided, in the nature of a retaining flange, which abuts in locking engagement against the inner surface of the recess 31 of the member G, to limit the screwed amplitude of movement of the bolt member 36 in the hub 30, and this positions the bolt for slidably receiving the bulbular or ball projection part 32 of the hub of the member H between the head 46 of the bolt and the flange 48; the opening 47 being greater in diameter than the diameter of the shank of the bolt, to permit a rocking movement of the member H upon the bolt, with the ball 32 in a ball and socket engagement with the hub 30 of the other member G, as is readily apparent from Figure 1 of the drawing.

The member H furthermore includes radially extending arms 50, preferably three in number, which are of the same thickness as the hub 33, adjacent to the ball 32, and which arms are disposed at preferably 120° apart, in an alternating relation with the radial arms 37 of the member G, when the members G and H are assembled, as is illustrated in Figure 3. At their outer ends the arms 50 are provided with the head portions 55, of increased thickness, preferably to one side of the arms 37, in facing relation towards the member G, and thru these thickened heads 55, openings 57 are provided, adapted to receive the bolts 25 by means of which the member H is rigidly connected to the spider 20 of the shaft section B, as is illustrated in the drawings. The head portion 55 of each arm 50 furthermore includes the laterally extending sleeve-like sockets 60, which extend in a T-shaped relation with the axis of the respective arms 50, one of the sleeve-like sockets 60 being placed at each side of the axis of the arms 50, and in the same plane as the member H. The two sleeve-like sockets 60 of each arm 50 are disposed in an angular relation of less than 180°, and preferably greater than 90°, and they diverge from the outer ends of the respective arms 50, so that all of the same lie in substantially a circle concentric with the axis of the joint. As is illustrated in the drawings the sleeve-like sockets 60 each provides a relatively deep substantially cylindrical shaped pocket 62, which opens at the free or outer edge 64 of the sleeve, in an open facing relation with respect to a flat or plane side 41 of a head 39 of the member G, when the members G and H are assembled. In fact, the axes of the pockets 62 are arranged at right angles to the facing flat or plane surface 41 of the adjacent head 39, as can be seen from Figure 4 of the drawings, and the sleeve-like sockets 60 are all disposed in the same plane, and preferably in a somewhat annular relation with the center of the universal joint as a center therefor. In fact, the axes of the sleeve-like sockets 60 and their pockets 62 are tangential to a circle scribed from the center of the joint, and all of the axes of the sleeve-like sockets 60 are disposed at the same distance from the center of the universal joint, for a purpose which is obvious.

In each of the pockets 62 of the sleeve sockets 60 it is preferred to place a plunger 66, which includes the reduced shank portion 67 and the headed portion 68 which provides a shoulder 69 between the portions 67 and 68, facing inwardly of the pocket, and against which a spiral compression spring 70 engages, to force the plunger 66 outwardly; the spring 70 at its opposite end resting in the bottom of the pocket 62, as can readily be seen from Figure 4 of the drawing. The outer end of each plunger 66 is arcuated or rounded, and the action of the spring 67 is such as to force this rounded end of the head from the forward edge 64 of the respective socket, into engagement with the plane or flat surface of the head 39 immediately facing the plunger.

From the foregoing description of the invention it is believed the operation will be apparent. The bolt 36 so connects the members G and H in a preferably ball and socket type of connection, as to limit the amplitude of movement to which said members may be relatively inclined. In this manner the bolt 36 positively connects the members G and H, and no positive connection need be effected between the arms of said members G and H, in order to limit the amplitude of movement to which said members may be swung during the universal joint action. It is to be particularly noted that the members G and H in general contour are flat, and compacted, the arms thereof being shallow, and the headed portions of said arms are disposed in the same plane by the alternated relation of the reduced arms 37 and 50. The sleeve sockets 60 are formed in a novel relation so that the arcuated plungers 66 thereof are spring urged into a sliding frictional contact with the flat and preferably plane faces of the heads 39, and these plungers can never ride off the respective flat surfaces 41 on which they ride, due to the limited degree of movement of the members G and H permitted by the ball and socket connection and the bolt 36.

The fact that the plungers are spring urged gives a buffing action to the universal joint which relieves the shaft sections B and C of considerable shock.

The simplicity of the improved universal joint, and the economy with which the same may be manufactured, renders the same particularly desirable for duty where compactness is essential, yet the improved joint possesses improved characteristics over the conventional compact fiber joint, in that the improved joint A is durably constructed of metal, and there is very little wear on the parts thereof.

Various changes in the shape, size, and arrangement of parts may be made to the form of invention herein shown and described, without departing from the spirit of the invention or the scope of the claims.

I claim:

1. In a universal joint the combination of a pair of members, means pivotally connecting said members centrally with a ball and socket joint to permit but limited degree of movement with respect to each other, each of said members having spaced arms, with the arms of the members alternating with each other, the arms of one of said members having plane surfaces facing the arms of the other member, and means on the arms of the last mentioned member slidably operating over said plane surfaces free of positive connection therewith.

2. In a universal joint the combination of a pair of spider-like members each including a hub portion and radially extending arms, means pivotally connecting said hub portions for a limited degree of movement, with the arms of said members alternating in the same plane, means on the outer ends of the arms of one of the members providing substantially radially disposed diverent plane surfaces at opposite sides thereof, and spring operated plunger means on the outer ends of the arms of the other member acting on said plane surfaces of the arms of the first mentioned member to resiliently connect the arms of said members for driving connection of one of said members by the other member upon rotation of the latter.

3. In a universal joint the combination of a pair of members each including a hub portion and spaced laterally extending arms, means pivotally connecting the hub portions of said members with the arms of the members in alternating relation, heads on the outer ends of the arms of one of said members each providing substantially radially disposed plane surfaces at the opposite sides thereof in the plane of said member diverging from the center of said member outwardly, heads on the outer ends of the arms of the other member providing oppositely facing sockets, plungers in said sockets, and spring means urging the plungers from the sockets into sliding frictional abutment with the plane surfaces of the arms of the other member.

4. In a universal joint the combination of a pair of members each including a hub portion and radially extending spaced arms, a ball and socket connection for the hubs of said members connected with said members for a limited degree of rocking movement, with the arms of said members in alternating relation, heads on the outer ends of the arms of one of said members each providing oppositely disposed plane surfaces facing the adjacent arms of the other member in radial relation with the center of said members. the arms of the other member having heads, and sleeves formed on said heads in a T-shaped relation with the respective arms on which they are formed, said sleeves thereon facing in the direction of the plane surfaces of the adjacent arms of the other member, plungers in said sleeves, and springs in said sleeves forcing said plungers outwardly from their respective sleeves into frictional sliding abutting relation with the plane surfaces immediately facing the same, on the arms of the other member.

5. In a universal joint the combination of a pair of shaft sections, a pair of substantially flat members including shallow hubs and thin radially extending arms from the respective hubs, a ball and socket connection for the hubs of said members including a bolt rigidly carried by one member upon which the other member may rock with a limited degree of movement with respect thereto, the arms of one of said members having oppositely facing plane surfaces, the arms of the other member having substantially T-shaped arranged sleeves thereon providing sockets in tangential relation with respect to the hub of their respective member, plungers in said sockets, spring means urging said plungers into abutment with the plane surfaces of the arms of the other member immediately facing the same, and means connecting said members with the shaft sections.

EDWARD K. DEGENER.